United States Patent
Fukuhara

(10) Patent No.: US 8,598,839 B2
(45) Date of Patent: Dec. 3, 2013

(54) METHOD FOR CONTROLLING SODIUM-SULFUR BATTERY

(75) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 324 days.

(21) Appl. No.: 13/038,618

(22) Filed: Mar. 2, 2011

(65) Prior Publication Data
US 2011/0199043 A1   Aug. 18, 2011

Related U.S. Application Data

(63) Continuation of application No. PCT/JP2009/066612, filed on Sep. 25, 2009.

(60) Provisional application No. 61/101,168, filed on Sep. 30, 2008.

(51) Int. Cl.
  *H02J 7/00* (2006.01)
  *G01R 21/00* (2006.01)
  *G01R 27/00* (2006.01)

(52) U.S. Cl.
  USPC ............. 320/101; 320/132; 320/134; 702/60; 702/63; 702/65

(58) Field of Classification Search
  CPC .......................................................... H02J 7/35
  USPC ................. 320/101, 134, 132; 702/60, 63, 65
  See application file for complete search history.

(56) References Cited

U.S. PATENT DOCUMENTS
2010/0259210 A1 * 10/2010 Sasaki et al. .................. 320/101

FOREIGN PATENT DOCUMENTS

| CN | 2331088 Y | | 7/1999 |
|---|---|---|---|
| EP | 1 912 305 A1 | | 4/2008 |
| JP | 11-069893 A1 | | 3/1999 |
| JP | 2003-169421 | * | 6/2003 |
| JP | 2003-169421 A1 | | 6/2003 |
| JP | 2004-031012 A1 | | 1/2004 |
| JP | 2004-098470 A1 | | 4/2004 |
| JP | 2005-073498 A1 | | 3/2005 |

OTHER PUBLICATIONS

Chinese Office Action (including Search Report) dated Dec. 27, 2012 (with English translation).
U.S. Appl. No. 13/038,609, filed Mar. 2, 2011, Fukuhara, Motohiro.
U.S. Appl. No. 13/039,709, filed Mar. 3, 2011, Fukuhara, Motohiro.

* cited by examiner

*Primary Examiner* — Drew A Dunn
*Assistant Examiner* — Nathaniel Pelton
(74) *Attorney, Agent, or Firm* — Burr & Brown

(57) ABSTRACT

A remaining battery level of each individual sodium-sulfur battery constituting a plurality of sodium-sulfur batteries is managed, a remaining battery level target value common to all sodium-sulfur batteries is set, and input/output power distributed to each individual sodium-sulfur battery is controlled based on a difference between the target value and the remaining battery level of the sodium-sulfur battery. This enables a uniform remaining battery level among the sodium-sulfur batteries to be attained.

8 Claims, 2 Drawing Sheets

METHOD FOR CONTROLLING SODIUM-SULFUR BATTERY

BACKGROUND OF THE INVENTION

1. Field of the Invention

The present invention relates to a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

2. Description of Related Art

In recent years, a natural energy power generation device for generating power from wind, solar power, geothermal heat, or the like has attracted attention and been put to practical use. The natural energy power generation device is a clean power generation device that does not use any limited resource such as oil but uses an energy resource present in unlimited quantity in nature, and can suppress carbon dioxide emissions. Hence, the natural energy power generation device has been increasingly introduced by companies, governments, and the like, for prevention of global warming.

However, since energy coming from nature varies from moment to moment, output fluctuations are unavoidable in the natural energy power generation device. This poses an obstacle to widespread use of the natural energy power generation device. To remove this obstacle, in the case of employing the natural energy power generation device, it is preferable to build an interconnected (power generation) system that combines the natural energy power generation device with an electric power storage-compensation device having a plurality of sodium-sulfur batteries (secondary batteries) as a main component.

A sodium-sulfur battery has features such as a high energy density, an ability to produce high output in a short time, and an excellent high-speed response. Accordingly, when a bidirectional converter for controlling charge and discharge is added, the sodium-sulfur battery offers an advantage that output fluctuations of the natural energy power generation device which can occur on the order of several hundred milliseconds to several seconds can be compensated. Therefore, the interconnected system in which the natural energy power generation device is combined with the electric power storage-compensation device having the plurality of sodium-sulfur batteries as the component is a desirable power generation system.

SUMMARY OF THE INVENTION

When used in load leveling, the electric power storage-compensation device having the plurality of sodium-sulfur batteries as the component is operated in such a manner that all sodium-sulfur batteries continuously discharge to reach a discharge end, and then continuously charge to reach a charge end (full charge). Accordingly, a remaining battery level (a dischargeable remaining electric quantity (Ah)) does not vary much among the sodium-sulfur batteries, and all of a plurality of electric power storage-compensation devices have approximately the same remaining battery level.

On the other hand, the interconnected system in which the natural energy power generation device is combined with the electric power storage-compensation device having the plurality of sodium-sulfur batteries as the component functions to compensate for fluctuations of the natural energy power generation device by the electric power storage-compensation device (sodium-sulfur battery), in order to achieve a smooth or completely flat output (as the interconnected system) according to a power generation plan designated by a human, a computer, or the like. Therefore, the sodium-sulfur batteries are operated in such a manner as to frequently repeat charge and discharge, and controlled so as not to reach a charge end or a discharge end.

In the case of maintaining the power generation plan by a plurality of electric power storage-compensation devices, when the plan value and the natural energy power generation device have a large deviation (a state in which the plan value and power generated by natural energy are apart from each other), all of the plurality of electric power storage-compensation devices are operated. When the deviation is small (a state in which the plan value and the power generated by natural energy approach each other), however, an unnecessary unit (electric power storage-compensation device including a sodium-sulfur battery) of the plurality of electric power storage-compensation devices is not operated and only a few units are operated, or overall balance is adjusted by increasing a control quantity of one unit and decreasing a control quantity of another unit among the plurality of electric power storage-compensation devices. This can lead to a variation in remaining battery level among individual sodium-sulfur batteries.

Such a variation in remaining battery level among sodium-sulfur batteries may make management by a manager or an operator complex. For example, when a situation where power generation of the natural energy power generation device cannot be expected due to natural environment (e.g., a no-wind condition in the case of a wind power generation device) is predicted, the manager or the like plans management so as to fully charge the sodium-sulfur batteries as much as possible beforehand. However, if the remaining battery level varies among the individual sodium-sulfur batteries, such management that manually repeats forced stop or operation in consideration of the remaining battery level is required, which places a significant burden on the manager or the like. This is undesirable for management of the interconnected system.

The present invention has been made in view of such circumstances, and has an object of providing a means for, in an interconnected system combining a natural energy power generation device that fluctuates in output and an electric power storage-compensation device that has a plurality of sodium-sulfur batteries as a component, attaining a uniform remaining battery level of the sodium-sulfur batteries. As a result of repeated studies, it has been found that the problem stated above can be solved by recognizing a remaining battery level of each individual sodium-sulfur battery and adjusting, through the use of the remaining battery level as a factor, a power distribution quantity assigned to the sodium-sulfur battery for charge or discharge. In detail, the following means is provided according to the present invention.

That is, according to the present invention, there is provided a method for controlling a plurality of sodium-sulfur batteries that, in an interconnected system in which a power generation device that fluctuates in output power and an electric power storage-compensation device are combined to supply power to an electric power system, are each included in the electric power storage-compensation device and compensate for fluctuations of the output power of the power generation device, the method including managing a remaining battery level of each individual sodium-sulfur battery constituting the plurality of sodium-sulfur batteries, setting a remaining battery level target value common to all sodium-sulfur batteries, and controlling input/output power distributed to each individual sodium-sulfur battery based on a difference between the target value and the remaining battery level of the sodium-sulfur battery.

For example, by referencing the remaining battery level of each individual sodium-sulfur battery in real time, a multiplying factor is set such that a sodium-sulfur battery far from the target value is charged more and a sodium-sulfur battery close to the target value is charged less. By multiplying, by this multiplying factor, a control quantity obtained from a deviation between a power generation plan value of the interconnected system and the power generation device (natural energy power generation device) that fluctuates in output power, a quantity of input/output power distributed to each sodium-sulfur battery is determined.

The remaining battery level of each individual sodium-sulfur battery can be managed by addition/subtraction of a current value. In detail, the remaining battery level (Ah) of each individual sodium-sulfur battery can be managed by inputting a current value required for charge/discharge of the sodium-sulfur battery into a control device such as a sequencer, and performing, from an initially set battery capacity (Ah), addition/subtraction of the current value (e.g., addition in the case of charge and subtraction in the case of discharge, or otherwise) and integration. Note that, if the remaining battery level can be accurately managed, then a battery depth (a depth of discharge (%)) can be known, too. Accordingly, the remaining battery level can be translated to the battery depth in this specification.

The setting of the remaining battery level target value common to all sodium-sulfur batteries and the adjustment of the input/output power distributed to each individual sodium-sulfur battery based on a difference between the target value and the remaining battery level of the sodium-sulfur battery are performed by a higher-level control (monitoring) device communicable with the control device such as the sequencer for controlling each individual sodium-sulfur battery.

The sodium-sulfur battery control method according to the present invention is particularly suitable when the power generation device that fluctuates in output is a natural energy power generation device that uses natural energy of at least one of wind, solar power, and geothermal heat.

The sodium-sulfur battery control method according to the present invention is a method for controlling a plurality of sodium-sulfur batteries that, in an interconnected system in which a power generation device that fluctuates in output and an electric power storage-compensation device are combined to supply power to an electric power system, are each included in the electric power storage-compensation device. In this specification, In an individual (one) sodium-sulfur battery constituting the plurality of sodium-sulfur batteries denotes a sodium-sulfur battery that is separated from other sodium-sulfur batteries in unit of control, and is not determined by the number of cells, the number of module batteries, an output magnitude, and the like. detail, in the case where a sodium-sulfur battery composes the electric power storage-compensation device, a sodium-sulfur battery under control of one bidirectional converter is treated as one sodium-sulfur battery (though a plurality of sodium-sulfur batteries 3 are shown in each of No. 1 to No. n in FIG. 1 described later, an expression such as "No. 1 sodium-sulfur battery 3" is used to treat the plurality of sodium-sulfur batteries 3 as one No. 1 sodium-sulfur battery 3). It is desirable that all sodium-sulfur batteries have the same rated capacity, though the rated capacity need not necessarily be the same.

In the sodium-sulfur battery control method according to the present invention, the remaining battery level of each individual sodium-sulfur battery constituting the plurality of sodium-sulfur batteries is managed, the remaining battery level target value common to all sodium-sulfur batteries is set, and the input/output power distributed to each individual sodium-sulfur battery is controlled based on the difference between the target value and the remaining battery level of the sodium-sulfur battery. Accordingly, while the electric power storage-compensation device (sodium-sulfur battery) compensates for fluctuations of the power generation device (natural energy power generation device) that fluctuates in output to thereby make the output smooth or flat according to the power generation plan of the interconnected system, the remaining battery level of the sodium-sulfur battery is automatically adjusted to the target value. As a result, a uniform remaining battery level can be attained.

If the remaining battery level is made uniform among all of the plurality of sodium-sulfur batteries by the sodium-sulfur battery control method according to the present invention, in the case where a situation in which power generation of the natural energy power generation device cannot be expected is predicted and the manager or the like plans management so as to fully charge the sodium-sulfur batteries beforehand, the management can be planned and carried out without taking the remaining battery level of each individual sodium-sulfur battery into consideration. This alleviates the burden of the manager or the like.

The sodium-sulfur battery control method according to the present invention can be utilized as a method for controlling, in an interconnected system in which a power generation device that uses natural energy such as wind, solar power, geothermal heat, or the like and fluctuates in output and an electric power storage-compensation device are combined to supply power to an electric power system, a plurality of sodium-sulfur batteries included in the electric power storage-compensation device.

DETAILED DESCRIPTION OF THE INVENTION

Figure 1:
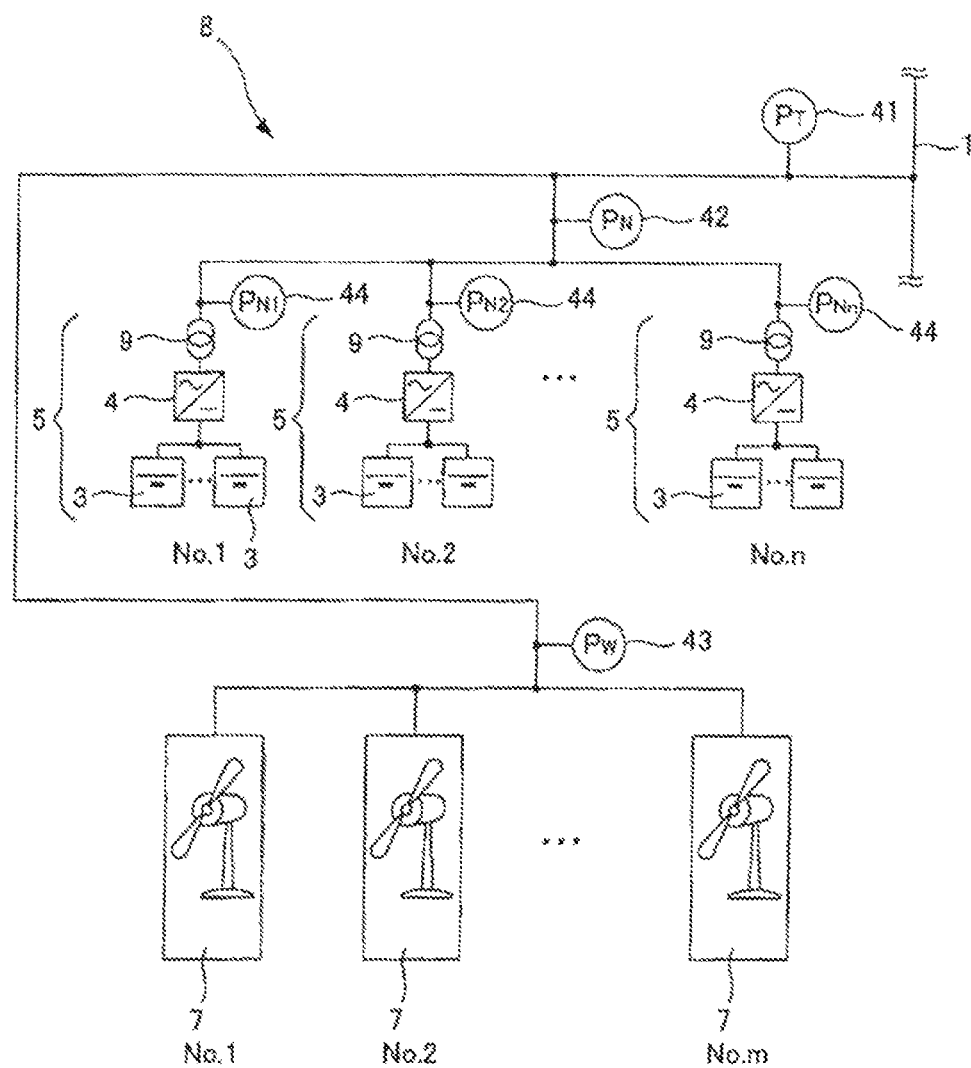
FIG. 1 is a system configuration diagram showing an example of an interconnected system including a power generation device that fluctuates in output and an electric power storage-compensation device.

The following describes an embodiment of the present invention, with reference to drawings according to need. It is to be understood that the present invention is not limited to the embodiment, and various changes, modifications, improvements, and replacements may be made on the basis of knowledge of a person skilled in the art without departing from the scope of the present invention. For example, though the drawings represent a preferred embodiment of the present invention, the present invention is not limited to the mode and information shown in the drawings. In order to implement or verify the present invention, means identical or equivalent to those described in this specification may be applied, and means described below are preferred means.

An interconnected system is described first. A system configuration diagram shown in FIG. 1 represents an example of an interconnected system including a power generation device that fluctuates in output and an electric power storage-compensation device. An interconnected system 8 shown in FIG. 1 includes a wind power generation device 7 (natural energy power generation device) that turns a power generator by converting wind power into windmill rotation, and an electric power storage-compensation device 5. The electric power storage-compensation device 5 includes a sodium-sulfur battery 3 (also written as a NAS battery) which is a secondary battery capable of storing and outputting power, a bidirectional converter 4 having a dc/ac conversion function, and a transformer 9. For example, the bidirectional converter 4 may be composed of a chopper and an inverter, or composed of an inverter. The interconnected system 8 has m systems of the wind power generation device 7, i.e., No. 1 to No. m (m is an integer larger than 1) and n systems of the sodium-sulfur battery 3 (the electric power storage-compensation device 5), i.e., No. 1 to No. n (n is an integer larger than 1).

As mentioned earlier, sodium-sulfur batteries 3 included in one electric power storage-compensation device 5 are treated as one sodium-sulfur battery 3 as a whole. Moreover, a typical interconnected system includes a private power generator as a power generation device and a sodium-sulfur battery heater and other auxiliary machines as a load, but they are omitted in the interconnected system 8. In the sodium-sulfur battery control method according to the present invention, they can be regarded as being included (added or subtracted) in power generated by the power generation device (the wind power generation device 7) that fluctuates in output.

In the interconnected system 8, the sodium-sulfur battery 3 is discharged in the electric power storage-compensation device 5, and power $P_N$ measured by a power meter 42 compensates for output fluctuations of power (power $P_W$ measured by a power meter 43) generated by the wind power generation device 7. In detail, by controlling the discharge (i.e., power $P_N$) of the sodium-sulfur battery 3 so that power (power $P_T$ measured by a power meter 41) output from the interconnected system 8 as a whole satisfies "$P_T = P_W + P_N$ = constant" ($P_N = P_T - P_W$), stable power of high quality is output as power $P_T$ from the whole interconnected system 8, and supplied, for example, to an electric power system 1 between a distributing substation and a consumer of electricity.

Moreover, in the interconnected system 8, the sodium-sulfur battery 3 is charged in the electric power storage-compensation device 5, in accordance with output fluctuations of power $P_W$ generated by the wind power generation device 7. In detail, by controlling the charge (i.e., power $-P_N$) of the sodium-sulfur battery 3 so that power $P_N$ measured by the power meter 42 is "$P_N = -P_W$", fluctuating power $P_W$ is consumed, as a result of which power $P_T$ output from the whole interconnected system 8 can be brought to 0.

In either of the case of charging the sodium-sulfur battery 3 and the case of discharging the sodium-sulfur battery 3, the sodium-sulfur battery 3 is charged or discharged by changing a control target value of the bidirectional converter 4 in the electric power storage-compensation device 5 based on the output (power $P_W$) of the wind power generation device 7 so that power for compensating for the output is input or output, thereby absorbing output fluctuations of the wind power generation device 7. Since stable power of high quality can be supplied by using the natural energy power generation device (the wind power generation device 7) that emits almost no carbon dioxide and the sodium-sulfur battery 3 (the electric power storage-compensation device 5), the interconnected system 8 is a favorable power generation system.

Figure 2:
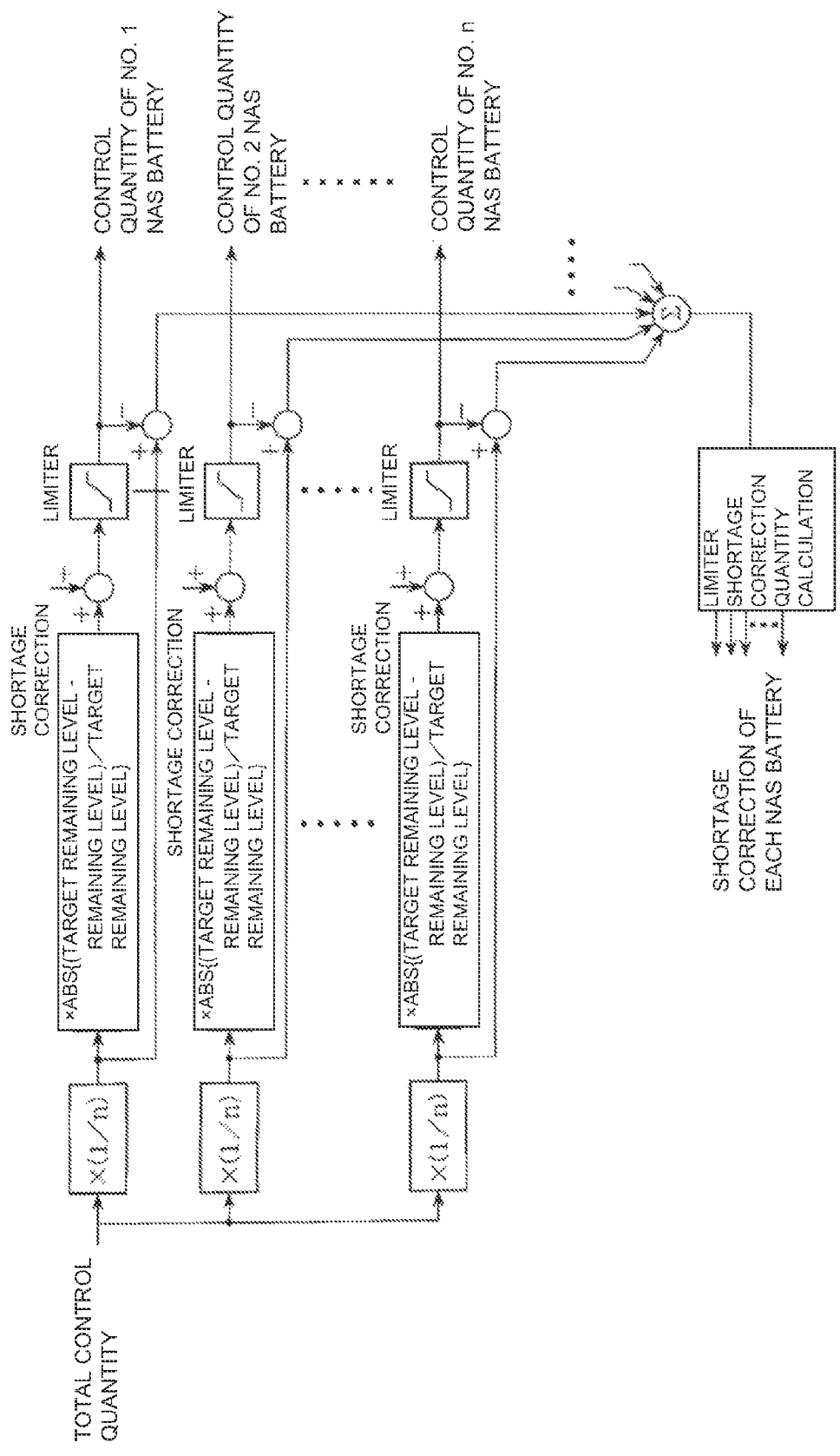
FIG. 2 is a block diagram showing a logic of distributing a total control quantity assigned to all sodium-sulfur batteries in the interconnected system, to each sodium-sulfur battery.

The following describes, with reference to FIG. 2, a method of managing a remaining battery level of each individual sodium-sulfur battery 3, and controlling input/output power distributed to each individual sodium-sulfur battery 3 based on a difference between the remaining battery level ("remaining level" in FIG. 2) and a remaining battery level target value ("target remaining level" in FIG. 2) common to all sodium-sulfur batteries 3, in the interconnected system 8 shown in FIG. 1.

FIG. 2 is a block diagram showing a logic of distributing a total control quantity assigned to all sodium-sulfur batteries in the interconnected system, to each sodium-sulfur battery. The total control quantity is distributed into 1/n, and weighted using "(target remaining level−remaining level)" as a parameter (in the example of FIG. 2, multiplied by a value (absolute value) obtained by dividing "(target remaining level−remaining level)" by "target remaining level"). After this, a control quantity obtained as a result of cutting a set value or more by a limiter is assigned to each sodium-sulfur battery 3 (unit) of No. 1 to No. n constituting the interconnected system 8, as No. 1 to No. n NAS battery control quantity. The set value (upper limit) of the limiter may be individually determined for each control quantity after the distribution into 1/n.

Since the limiter is provided in the calculation of the control quantity assigned to each sodium-sulfur battery 3 (unit) of No. 1 to No. n, there may be the case where the control quantity actually assigned to each sodium-sulfur battery 3 after passing the limiter (i.e., an output value of the limiter) is smaller than the value obtained by distributing the total control quantity into 1/n (i.e., an input value of the limiter). In view of this, a sum (limiter shortage correction quantity) of the difference between the input value and the output value of each limiter is calculated (in a limiter shortage correction quantity calculation logic) and redistributed. This limiter shortage correction quantity (control quantity) corresponds to a shortage of a control quantity that is to be distributed to any of the sodium-sulfur batteries 3. In detail, the redistribution is performed by adding the sum to the input value of each limiter.

INDUSTRIAL APPLICABILITY

The present invention is suitably used as a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

DESCRIPTION OF REFERENCE NUMERALS

1: electric power system
3: sodium-sulfur battery
4: bidirectional converter
5: power storage-compensation device
7: wind power generation device
8: interconnected system
9: transformer
41, 42, 43, 44: power meter

The invention claimed is:

1. A method for controlling a plurality of sodium-sulfur batteries that, in an interconnected system in which a power generation device that fluctuates in output power and an electric power storage-compensation device are combined to supply power to an electric power system, are each included in the electric power storage-compensation device and compensate for fluctuations of the output power of the power generation device, the method comprising:

managing a remaining battery level of each individual sodium-sulfur battery by inputting a current value required for charge/discharge of the sodium-sulfur battery into a control device, and performing, from an initially set battery capacity, addition/subtraction of the current value and integration;

setting a remaining battery level target value common to all sodium-sulfur batteries; and determining a quantity of input/output power distributed to each sodium-sulfur battery, by multiplying, by a multiplying factor, a control quantity obtained from a deviation between a power generation plan value of the interconnected system and the power generation device that fluctuates in output power, wherein the multiplying factor is set such that a sodium-sulfur battery furthest from the target value is charged more and a sodium-sulfur battery closest to the target value is charged less by referencing the remaining battery level of each individual sodium-sulfur battery in real time.

2. The method for controlling a plurality of sodium-sulfur batteries according to claim 1, wherein the power generation device that fluctuates in output is a natural energy power generation device that uses natural energy of at least one of wind, solar power, and geothermal heat.

3. The method for controlling a plurality of sodium-sulfur batteries according to claim 1, wherein when the interconnected system has n systems of the sodium-sulfur battery, with n being an integer larger than 1, a value is calculated by multiplying 1/n by the total control quantity of the input/output power assigned to all sodium-sulfur batteries, and a difference between the target value and the remaining battery level of each individual sodium-sulfur battery is calculated, and the value calculated by multiplying 1/n by the total control quantity is weighted using the difference as a parameter, and input/output power distributed to each individual sodium-sulfur battery is controlled based on the value after the weighting.

4. The method for controlling a plurality of sodium-sulfur batteries according to claim 3, wherein an absolute value is obtained based on a value calculated by dividing the difference by the target value, and the weighting is performed by multiplying the absolute value by the value calculated by multiplying 1/n by the total control quantity.

5. The method for controlling a plurality of sodium-sulfur batteries according to claim 4, wherein the value after the weighting is inputted into a limiter assigned correspondingly to the each individual sodium-sulfur battery, and an output value is obtained from the input value as a result of cutting a set value or more by the limiter, and input/output power of each individual sodium-sulfur battery is controlled based on the output value.

6. The method for controlling a plurality of sodium-sulfur batteries according to claim 5, wherein a limiter shortage correction quantity is calculated as a sum of a difference between the input value and the output value of each limiter, and the limiter shortage correction quantity is redistributed to each of the limiters.

7. The method for controlling a plurality of sodium-sulfur batteries according to claim 5, wherein an upper limit set value of the limiter is individually determined for each control quantity after the distribution into 1/n.

8. The method for controlling a plurality of sodium-sulfur batteries according to claim 6, wherein an upper limit set value of the limiter is individually determined for each control quantity after the distribution into 1/n.

* * * * *